United States Patent [19]
Sobiepanek et al.

[11] Patent Number: 4,716,486
[45] Date of Patent: Dec. 29, 1987

[54] ELECTRIC MOTOR COMPRISING A THERMISTOR-TYPE OVERCURRENT PROTECTION DEVICE

[75] Inventors: Janusz Sobiepanek, Gif/Yvette; Simon Aboukrat, Garges Lès Gonesse, both of France

[73] Assignee: Etudes Techniques et Representations Industrielles E.T.R.I., Neuilly-sur-Seine, France

[21] Appl. No.: 835,303

[22] Filed: Mar. 3, 1986

[30] Foreign Application Priority Data

Mar. 15, 1985 [FR] France .................................. 85 03858

[51] Int. Cl.⁴ ........................ H02H 5/04; H02H 7/08
[52] U.S. Cl. ........................................ 361/24; 361/27; 361/106; 318/783; 318/434; 318/471
[58] Field of Search ..................... 361/24, 27, 23, 106; 318/799, 434, 471, 473, 565, 334, 783, 430

[56] References Cited

U.S. PATENT DOCUMENTS 3,673,538  6/1972  Faxon ............................ 361/27 X
3,708,720  1/1973  Whitney et al. ................ 318/473 X
3,965,392  6/1976  Moorhead et al. ............. 318/783 X

FOREIGN PATENT DOCUMENTS 2243949  3/1974  Fed. Rep. of Germany .
2212669  7/1974  France .
2064899  6/1981  United Kingdom .

Primary Examiner—J. R. Scott
Assistant Examiner—Todd E. DeBoer
Attorney, Agent, or Firm—Young & Thompson

[57] ABSTRACT

A device providing protection against over-currents in the windings of an electric motor having a rotor (3) and at least two windings (1, 2) comprises at least two parallel thermistors (17, 18) each mounted in series with at least one motor winding (1, 2).

3 Claims, 2 Drawing Figures

ELECTRIC MOTOR COMPRISING A THERMISTOR-TYPE OVERCURRENT PROTECTION DEVICE

BACKGROUND OF THE INVENTION

1. Field of the Invention

The present invention relates to an electric motor comprising a thermistor-type overcurrent protection device.

2. Description of the Prior Art

It is a known practice to protect the windings of an electric motor by connecting them in series with a thermistor having a positive temperature coefficient, that is to say an ohmic value which is an increasing function of temperature. When the current intensity increases in the circuit, the thermistor undergoes a temperature rise which tends to reduce the supply current as well as the terminal voltage of the excited winding possibly to such an extent that this winding is put out of service.

A device of this type is employed in particular in electronically switched direct-current motors having the function of driving fans for cooling electrical appliances. In this case the motor usually has two windings supplied alternately under the control of a rotor-position detector. In the known devices, use is made of a single thermistor in series with the two windings which are in turn in parallel with respect to each other. When the rotor is brought to a standstill by an obstacle, the thermistor heats up and causes a voltage drop within both windings at the same time. In the case of a cooling fan, the motor load is zero at zero speed and cooling of the thermistor permits re-starting of the motor when the disturbance has ceased. However, as long as the thermistor has not returned to its normal value, it continues to influence the supply voltage of the two windings. The result is that re-starting of the fan takes place slowly or even that, in extreme cases, the residual voltage is not sufficient to ensure correct re-starting of the motor.

SUMMARY OF THE INVENTION

One object of the present invention is to propose an electric motor in which provision is made for an overcurrent protection device comprising thermistors, in which the voltage supply to the windings is not totally affected at the time of a momentary stoppage and which is capable of re-starting rapidly after the cause of said stoppage has been removed.

In order to achieve this object, the electric motor proposed in accordance with the invention comprises a rotor, at least two motor windings and a device for providing protection against overcurrents in the motor windings and comprising thermistors having a positive temperature coefficient. In accordance with a distinctive feature of the protective device, said device comprises at least two parallel thermistors each mounted in series with at least one motor winding.

Thus, in the event of stoppage of the motor, the thermistor associated with the continuously excited winding undergoes a temperature rise. When the cause of the stoppage has been removed, the winding whose thermistor has not heated up is supplied at a normal voltage, thus permitting rapid re-starting of the motor.

In an advantageous embodiment of the invention, the electric motor comprises at least one shunt resistor, each end of said resistor being connected to one terminal of two adjacent motor windings at the level of a point of connection of each motor winding to the associated thermistor.

Thus the shunt resistor delivers a complementary supply current into the circuit of the winding which is affected by the stoppage and produces accelerated re-starting of the rotor.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

Figure 1:
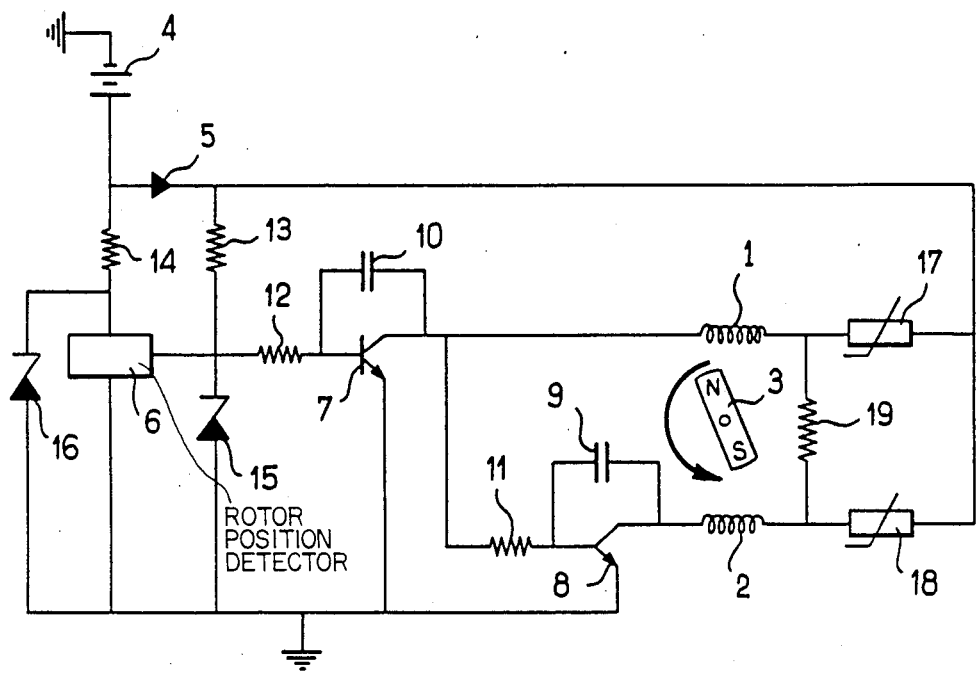
FIG. 1 is a schematic representation of an electric motor equipped with an overcurrent protection device in accordance with the invention.

Referring first to FIG. 1, the electronically switched direct-current motor is provided in the conventional manner with two motor windings 1, 2 mounted in parallel opposite to a rotor 3 which is represented schematically by a permanent bar magnet. The motor windings 1, 2 are supplied from a direct-current voltage source 4 which is protected against polarity reversals by a diode 5.

The current supply control system further comprises in the usual manner a rotor-position detector 6 for the rotor 3. By way of example, said position detector comprises a Hall generator associated with a transistor (not shown) connected to transistors 7 and 8 which are alternately turned-on and cut-off by the detector 6. In addition, the circuit comprises in known manner suppressor capacitors 9, 10, matching resistors 11, 12, 13, 14 and Zener diodes 15, 16 connected to the terminals of the position detector 6.

In accordance with the invention, the overcurrent protection device comprises two parallel-connected thermistors 17, 18 having a positive temperature coefficient and each mounted in series respectively with one of the motor windings 1, 2.

The operation of the device will now be described. Assuming by way of example that the motor winding which is excited at the moment of accidental stoppage of the motor is the winding 1, then the thermistor 17 undergoes a temperature rise whilst the thermistor 18 which is located in the circuit of the unexcited motor winding 2 remains at its normal operating point.

At the time of release of the motor, the weak current which continues to flow through the thermistor 17 and the winding 1 is sufficient to cause the rotor to rotate through a predetermined angle, thereby initiating a changeover of the position detector 6 which accordingly cuts-off the transistor 7 and turns-on the transistor 8. The motor winding 2 is then supplied under normal conditions, that is to say with a small voltage drop in the thermistor 18. In consequence, the voltage at the terminals of the winding 2 is also at its normal value, which accordingly permits rapid re-starting of the rotor 3. Since there is no longer a continuous flow of current through the thermistor 17, this latter is rapidly restored to its normal temperature and rotation of the motor once again becomes uniform.

In a preferred embodiment of the invention, provision is additionally made for a shunt resistor 19, each end of said resistor being connected to one terminal of the two motor windings 1, 2 at the level of a branch point at which each motor winding is joined to the associated thermistor 17, 18 respectively. The choice of the ohmic value of the resistor 19 is determined as a function of the minimum value required for obtaining the additional voltage which is necessary in order to overcome the resistance of the static friction forces acting on the driven element. A preferential experimental value is in the vicinity of the hot-state ohmic value of the adjacent thermistor 17, 18.

In the aforementioned example of a stoppage occurring at the time of excitation of the motor winding 1 followed by release of the motor, the current which flows through the thermistor 17 is completed by a current which passes through the thermistor 18 and the shunt resistor 19, with the result that the voltage applied to the motor winding 1 is increased, thus enabling the rotor to rotate at a higher speed through the angle required for obtaining switchover of the position detector.

Figure 2:
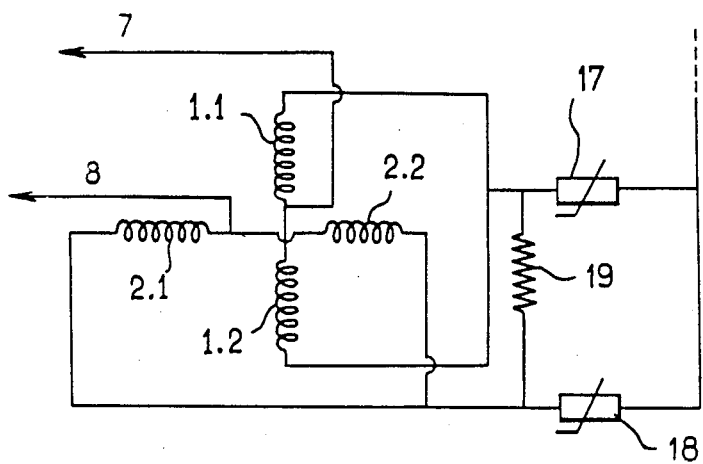
FIG. 2 is a partial schematic representation of an alternative embodiment of the motor in accordance with the invention.

In accordance with the alternative embodiment illustrated in FIG. 2, the circuit usually comprises the same components as those of FIG. 1 and the motor has in this case four motor windings mounted in parallel and in pairs designated respectively by the references 1.1, 1.2 and 2.1, 2.2. The thermistor 17 is mounted in series with the two parallel windings 1.1, 1.2 whilst the thermistor 18 is mounted in series with the two parallel windings 2.1, 2.2. The ends of the shunt resistor 19 are connected respectively to a line which is common to the windings 1.1 and 1.2 and to a line which is common to the windings 2.1 and 2.2. Thus each end of said resistor is connected to one terminal of two adjacent motor windings such as those designated by the references 1.1 and 2.2 for example, at the level of the branch point at which each motor winding is joined to the associated thermistor.

The operation of the embodiment just described is identical with the operation described earlier with reference to FIG. 1: in particular, when a stoppage of the motor occurs at the moment of excitation of the motor windings 1.1, 1.2, the thermistor 17 alone undergoes a temperature rise and the windings 2.1, 2.2 are consequently in their normal state of operation at the time of release of the motor.

It is readily apparent that the invention is not limited to the embodiment described in the foregoing and many alternative forms of construction may accordingly be contemplated without thereby departing either from the scope or the spirit of the invention.

In particular, the protection device in accordance with the invention can be adapted to motors which have a large number of windings. These windings can accordingly be associated in groups, each group being connected to one thermistor. Alternatively, the windings can each be connected individually to one thermistor.

What is claimed is:

1. An electronically switched direct-current motor comprising at least two motor windings (1, 2), and a device used in protection against overcurrent in the motor windings (1, 2) and in aid of motor restart after a stoppage of the motor, wherein said device comprises at least two positive temperature coefficient thermistors (17, 18), one (17) of said thermistors being series-connected with a first motor winding (1) whilst the other thermistor (18) is series-connected with a second winding (2), each thermistor being thermally independent from the other, wherein said first winding and said one of said thermistors, and said second winding and said other thermistor, when energized, have electrically parallel current paths between a source of direct current and the ground.

2. A motor according to claim 1, wherein said motor comprises at least one shunt resistor (19), the ends of said resistor being connected respectively to one terminal of two adjacent motor windings at the point of connection of each motor winding (1, 2) to the associated thermistor (17, 18).

3. A motor according to claim 2, wherein the shunt resistor (19) has an ohmic value in the vicinity of the hot-state ohmic value of an adjacent thermistor (17, 18).

* * * * *